April 30, 1929. R. H. HASSLER 1,710,822
MASSAGING MACHINE
Filed Dec. 2, 1926 2 Sheets-Sheet 2
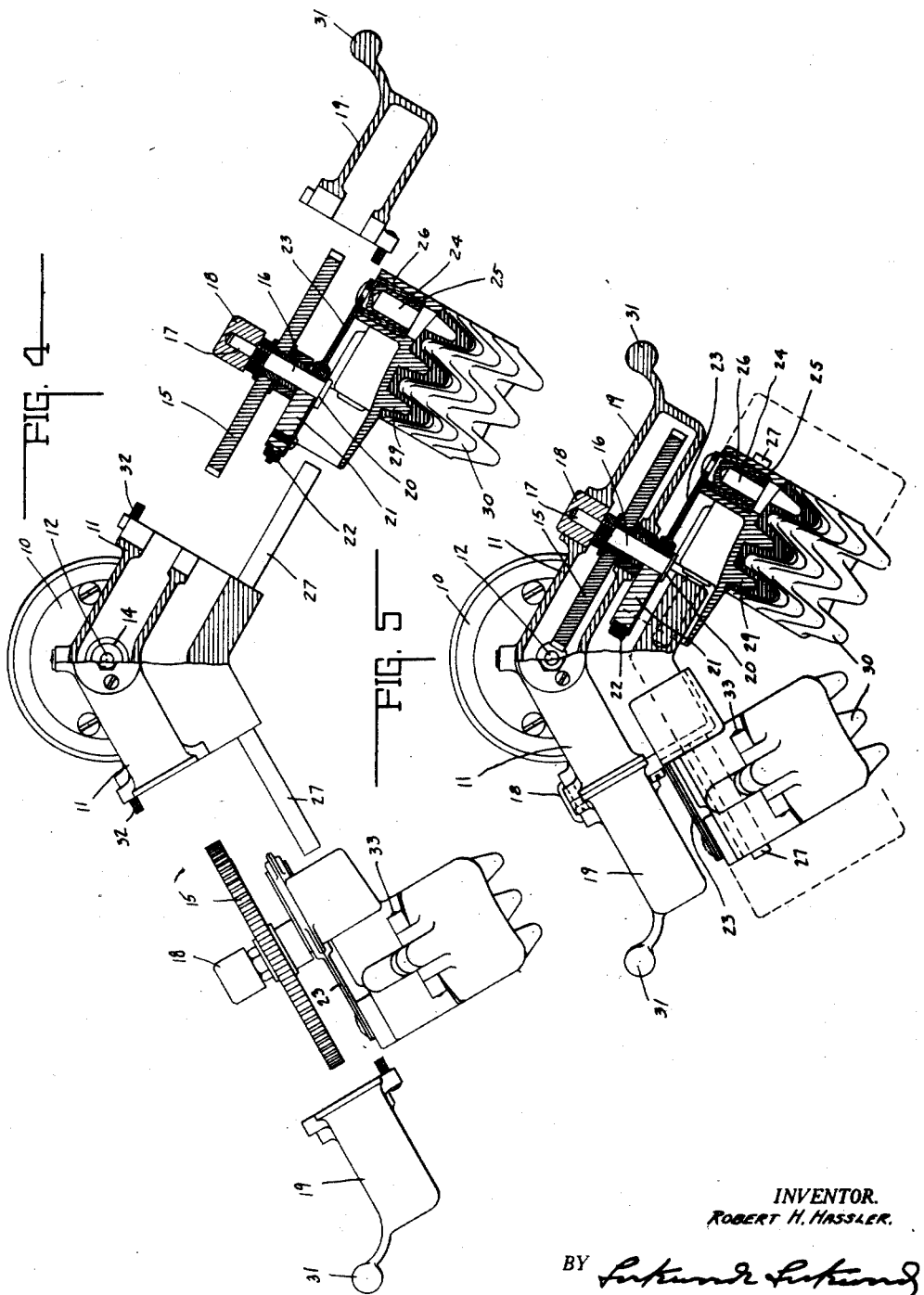
INVENTOR.
ROBERT H. HASSLER.
BY
ATTORNEYS Patented Apr. 30, 1929.

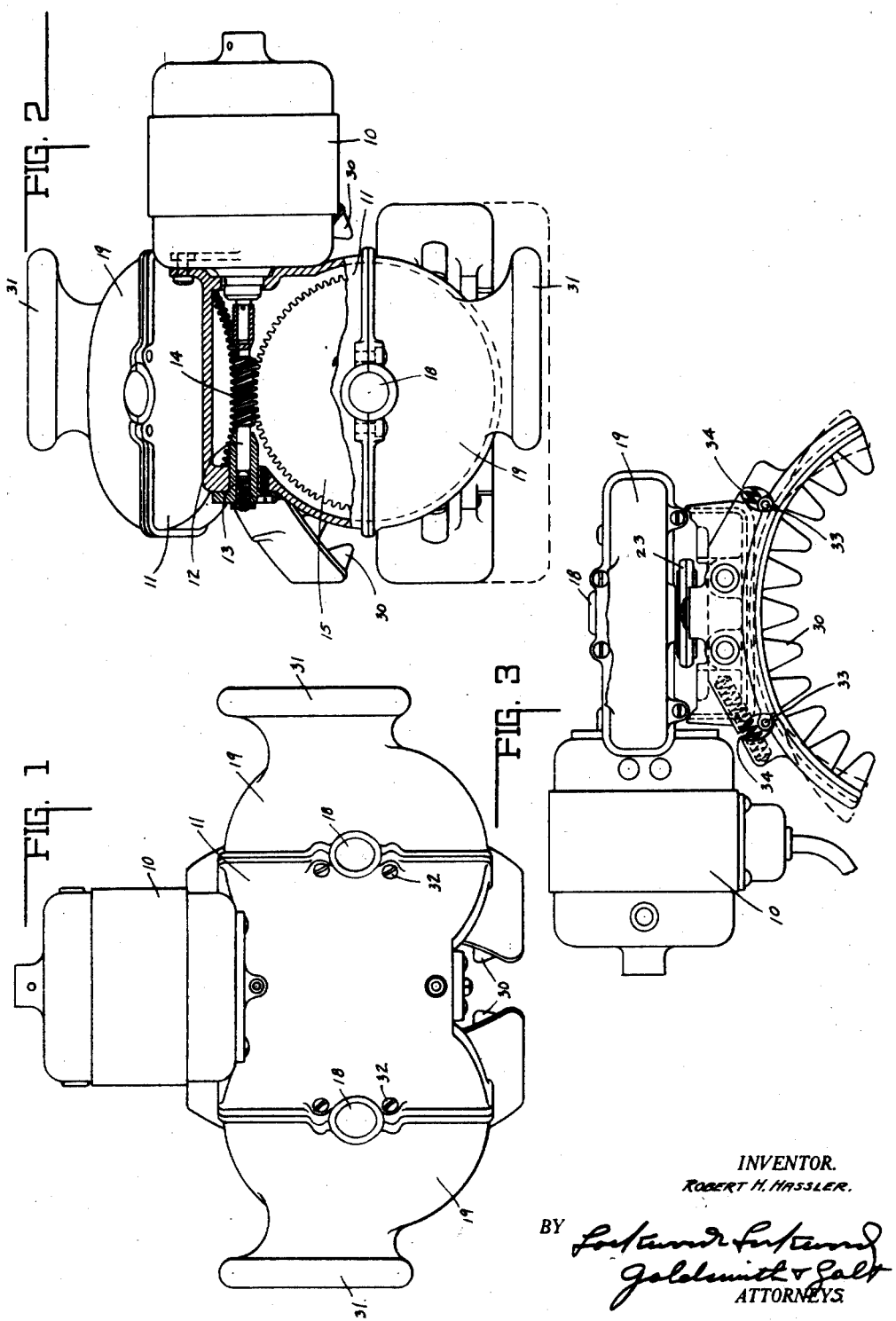

1,710,822

UNITED STATES PATENT OFFICE.

ROBERT H. HASSLER, OF INDIANAPOLIS, INDIANA.

MASSAGING MACHINE.

Application filed December 2, 1926. Serial No. 152,083.

This invention relates to a motor driven massage machine for massaging, rubbing or manipulating the scalp of the human head of that type shown and disclosed in application Serial No. 136,421, filed September 20, 1926.

The principal object of this invention is to so construct the various elements of the mechanism, and particularly the housing therefor, as to facilitate its manufacture and assembly. By means of this invention, the various parts of the machine are brought together and combined in different units bearing such relation to each other as to permit each unit to be built up separately, and then readily joined with the other units to complete the assembly.

The full nature of the invention will be understood from the accompanying drawings and the following description and claims:

In the drawings, Figure 1 is a plan view looking down upon the machine. Fig. 2 is a plan view of one side of the machine, showing the other side in perspective, with parts broken away. Fig. 3 is an end elevation of one side of the machine. Fig. 4 is a front elevation of the parts in assembling position before assembly, and showing portions thereof in cross section. Fig. 5 is a front elevation of the complete machine after assembly of the parts shown in Fig. 4, one side thereof being shown in central vertical section.

In the drawings, there is shown a massage machine or mechanism comprising an electric motor 10 rigidly secured to a saddle-like central housing 11, the ends of said housing extending at an angle to each other as best shown in Fig. 4. Positioned in said housing there is a horizontally-extending motor-driven shaft 12 having its free end mounted in a suitable thrust end bearing 13 secured in said housing. Mounted on the shaft 13 and keyed thereto there is a worm 14 driven by the motor 10 and so positioned as to mesh with the worm gears 15 when the units are assembled, as shown in Figs. 2 and 5, so as to cause the rotation thereof. It will be noted that the gears 15 are positioned in planes extending at an angle to each other, and by reason of their being driven by a common worm, are rotated in opposite directions.

Each of said gears is keyed to a shaft 16 and each of said shafts is provided with a reduced bearing surface 17 mounted in the bearings 18 formed of suitable bearing metal securely fitted between the adjacent ends of the housing 11 and the end housings 19.

The lower end of the shaft 16 is provided with a head 20 and eccentrically keyed to an annular rotating block 21 which is rotatably mounted in a driving collar 22 to which is secured a driving arm 23.

The arms 23 extend below and exteriorly of the housings 11 and 19 in planes parallel to their respective gears 15, having their free ends secured to the driving pins 24 rotatably mounted in the bushings 25. Both the bushings 25 and the driving collars 22 are formed of suitable impregnated wood for providing a bearing surface, said bushings being mounted in their respective massaging elements 26. The housing 11 is provided with a pair of guide pins 27 extending from each end thereof, upon which the massaging elements 25 are adapted to slide and be supported, said elements being provided with corresponding recesses for receiving said pins. Thus the movement imparted to said elements by the rotation of the gears 15 will impart a reciprocating movement, said two elements sliding back and forth upon the pins 27, which will maintain them during such movements in a straight line. Said elements are provided on their underside with a plurality of prongs 29 and covered with a suitable rubber massage pad 30 for engaging and manipulating the scalp.

As herein shown, the machine is first built up in five different units, the central unit comprising the motor, driving shaft and worm mounted on the housing 11, the two manipulating units comprising the worm gears 15, the pads and an intermediate actuating mechanism, and the end units or housings 19 which are provided with upwardly-extending handles 31, all of which is best illustrated in respective positions by Fig. 4. The units are then readily assembled by merely sliding the massage element units into position on the pins 27 so that the gears 15 mesh with the worm 14. The end housing units 19 are then mounted over a portion thereof so that the gears and associated driving mechanism will be completely housed and held in position by the securing of the housings 19 to the central housing 11 through the medium of the screws 32.

It will be noted in Fig. 3 that the massaging element is provided with a rigid central portion having end portions which are hingedly connected thereto at 33 and normally maintained in the position shown by full lines through the medium of the compression springs 34 which are supported in suitable recesses formed in the casting of the element. This causes the end or wing portions to be normally forced downwardly to embrace and conform to those portions of the scalp of lesser radius, while at the same time permitting compression of said springs under tension to permit the element to conform to curvatures of the scalp of greater radius.

From the foregoing, it will be observed that the general shape and combination of elements in the machine are such as to cause the massaging elements to conform to the contour of the head so as to have a gripping action on each side thereof when the operator pulls down on the handles 31. Thus the planes of movement of the massaging elements are arranged at an angle to each other. The motor driven shaft 12 which is rotated at comparatively high speed will impart to the angularly disposed gears 15 a rotary movement, the worm and gear drive therebetween being such as to give a substantial reduction in speed. The gears are rotated in opposite directions and are angularly disposed to each other so as to provide a direct drive to the angularly disposed massaging elements. The driving collars 22 being eccentrically mounted on the shaft 16, will impart a reciprocating motion to the arms 23 which in turn will impart to the massaging elements a corresponding reciprocating motion due to their being slidably mounted on the machine by the pins 27. The motion of the respective elements will be in opposite directions so that the thrust created thereby on the scalp will be neutralized.

By means of this construction a convenient and compact machine of light weight is provided which will enable not only an operator to apply it to a scalp to be treated, but will also enable one to readily apply it to his own scalp for individual and personal treatment.

The invention claimed is:

1. In a massage machine, a central housing portion having angularly disposed open-faced ends, a driving member associated therewith, a pair of angularly disposed massage elements, driving mechanism associated therewith for imparting a reciprocatory movement thereto, means for slidably supporting said massage elements on said central housing portion, whereby the same may be slidably mounted therein for operative engagement with said driving means, end housing portions mounted over said mechanism, and means for securing said end portions to said central housing portion for retaining said mechanism in operative position and enclosing the same while permitting of its ready removal upon separation of said housing portions.

2. In a massage machine, a central housing portion having angularly disposed open-faced ends, a driving member associated therewith, a pair of angularly disposed massage elements, driving mechanism associated therewith for imparting a reciprocatory movement thereto, means for slidably supporting said massage elements on said central housing portion, whereby the same may be slidably mounted therein for operative engagement with said driving means, end housing portions mounted over said mechanism, means for securing said end housing portions to said central housing portion for retaining said mechanism in operative position and enclosing the same while permitting of its ready removal upon separation of said housing portions, and gripping members formed on said end housing portions.

3. In a massage machine, a plurality of angularly disposed driving gears, a motor for simultaneously driving said gears, a plurality of massaging elements positioned in angular relation to each other, means driven by said gears for imparting a reciprocating movement to said massaging elements whereby each of said elements will be reciprocated in a straight line in angular relation to each other and in opposite directions, a central housing portion upon which said motor is mounted adapted to receive said driving gears, a pair of end housing portions mounted over said gears for enclosing the same, and means for securing said housing portions together for retaining said gears in operative position.

4. In a massage machine, the combination with a unit comprising a massaging element, a worm gear, and means for transforming the rotary movement of said worm gear to a reciprocatory movement of said element, of a central supporting housing for receiving and supporting said worm gear including a driving motor and a worm driven thereby adapted to mesh with and drive said worm gear, and a housing portion adapted to be secured to said first-mentioned housing for enclosing the gear in conjunction therewith and maintain it in supported and enclosed position.

In witness whereof, I have hereunto affixed my signature.

ROBERT H. HASSLER.